United States Patent

Nagarajan et al.

[11] Patent Number: 5,995,671
[45] Date of Patent: *Nov. 30, 1999

[54] EFFICIENT REPRESENTATION OF TEXTURE FOR GRAY SCALE ALPHA MAPS

[75] Inventors: Ram Nagarajan, Los Angeles; Peter H. Au, Hermosa Beach, both of Calif.

[73] Assignee: Hughes Electronics Corporation, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/745,585

[22] Filed: Nov. 8, 1996

[51] Int. Cl.[6] .............................. G06K 9/36; G06K 9/48
[52] U.S. Cl. ......................... 382/242; 382/237; 382/266
[58] Field of Search .................................... 382/242, 268, 382/269, 237, 239, 243, 266; 348/597, 578; 345/433, 435, 436

[56] References Cited

U.S. PATENT DOCUMENTS

| | | | |
|---|---|---|---|
| 4,156,880 | 5/1979 | Yamada | 358/261.2 |
| 4,668,995 | 5/1987 | Chen et al. | 382/272 |
| 4,873,515 | 10/1989 | Dickson et al. | 345/147 |
| 5,122,873 | 6/1992 | Golin | 382/240 |
| 5,185,808 | 2/1993 | Cok | 382/268 |
| 5,262,856 | 11/1993 | Lippman et al. | 348/415 |
| 5,377,014 | 12/1994 | Knauer et al. | 348/409 |
| 5,598,215 | 1/1997 | Watanabe | 382/242 |
| 5,625,417 | 4/1997 | Lee | 348/416 |
| 5,737,449 | 4/1998 | Lee | 382/242 |

OTHER PUBLICATIONS

Wang et al., "Applying Mid–level Vision Techniques for Video Data Compression and Manipulation", Feb. 1994, pp. 1–12.

*Primary Examiner*—Amelia Au
*Assistant Examiner*—Timothy M. Johnson
*Attorney, Agent, or Firm*—John A. Crook; Michael W.. Sales

[57] ABSTRACT

A method for compressing the bit data of an alpha mask image frame composed of an array of pixels having bit data indicative of a level of brightness includes selecting a modifying function identifier which represents a mathematical transformation, applying a threshold function to the alpha mask image frame to generate a binary image frame, and encoding the binary image frame and the modifying function identifier for transmission. The method may include receiving an encoded signal containing the binary image frame and the modifying function identifier, decoding the encoded signal to extract the binary image frame and the modifying function identifier, selecting the mathematical transformation represented by the modifying function identifier, and then transforming the bit data of at least one pixel in accordance with the mathematical transformation.

4 Claims, 5 Drawing Sheets

EFFICIENT REPRESENTATION OF TEXTURE FOR GRAY SCALE ALPHA MAPS

TECHNICAL FIELD

The present invention relates to methods and systems for encoding and decoding digital video signals.

BACKGROUND ART

Video compression methods are employed to reduce the number of bits needed to transmit and store a digital video signal. As a result, a lower bandwidth communication channel can be employed to transmit a compressed video signal in comparison to an uncompressed video signal. Similarly, a reduced capacity of a storage device, which can comprise a memory or a magnetic storage medium, is required for storing the compressed video signal. A general video compression method includes encoding, which converts the video signal into a compressed signal, and decoding, which reconstructs the video signal based upon the compressed signal.

A video signal is a sequence of image frames that are created when a scanning system captures an image at periodic intervals of time. Each frame of the sequence is a function of two spatial variables x and y and a temporal variable t. A frame consists of an array of digital picture elements or pixels located along the horizontal spatial variable x and the vertical spacial variable y. As examples, a frame may consist of an array of 512×480 pixels, 176×144 pixels, 720×576 pixels, or the like.

To the observer, the pixels form images or objects in the frame. Each of the objects has an outer edge which is referred to as the contour of the object. The contour of an object separates that object from other objects in the frame.

Each pixel is represented as a digital code word having a given number of bits. A bit can have a value of zero or one. Many facsimile and printing devices have one bit allocated to each pixel. If the bit has a value of one, then ink is applied to the pixel location. If the bit has a value of zero, then no ink is applied to the pixel location. Thus, these devices are known as bi-level.

Many applications such as multimedia and the like use digital code words having more than one bit allocated to each pixel. Typically, eight to thirty-two bit digital code words may be used to represent a pixel.

Thus, an eight bit code word can have a value, in base 10 numerals, ranging from zero to 255. Consequently, each pixel can have many more color shades or brightness levels than the bi-level devices because there is more information available in the eight bit code word.

For instance, a gray scale image frame consists of pixels having several defined levels of brightness with the neutral color gray. In essence, assuming that each pixel in a gray scale image frame is represented by an eight bit code word, the level of brightness of a pixel is scaled from a value of zero to 255. Similar to bi-level devices, a pixel is black if the code word has a value of zero and is white if the code word has a value of 255. Unlike the bi-level devices, a pixel in a gray scale image frame can embody a variety of shades. If the code word has a value close to 255 then the pixel is light gray or if the value is close to zero then the pixel is dark gray. Finally, if the code word has a value of 127 then the pixel is true gray. Thus, a gray scale image frame is known as a multilevel continuous-tone image frame.

A gray scale image frame must be compressed to reduce the transmission time and meet stringent memory limitations for virtually all applications. For instance, an image frame consisting of an array of 720×576 pixels with each pixel represented by an eight bit code word would take about 52 seconds to transmit over a 64 Kbit/second transmission line. The amount of memory stored would be over 3.3 Mbits. The transmission rate and the amount of memory needed are much too high for bandwidth and memory storage constraints of a typical application.

A gray scale alpha mask is a code or an instruction that identifies the transparency of each pixel of the image frame. A gray scale alpha mask is structurally the same as a gray scale image frame. But while a gray scale image frame is meant to be viewed as an image, a gray scale alpha mask is a code for each pixel that identifies its transparency. For the sake of simplicity, we will refer to gray scale alpha masks as gray scale image frames and the alpha values as shades of gray. For a large percentage of gray scale alpha masks, the textures are relatively simple. The texture of a gray scale alpha mask refers to the alpha values of a group of pixels in a portion of the frame or all the pixels in the whole frame. Alpha refers to the value of the digital code word representing the transparency of a pixel.

One example of a simple texture is a gray scale alpha mask consisting of pixels having a constant gray shade. Thus, each pixel in this alpha mask is represented by the same digital code word having a given value. For instance, the value of 127 meaning that each pixel in the frame has a true gray color or equal transparency.

Another example of a simple texture is a gray scale alpha mask that consists of a binary alpha mask with the code word value of the pixels around the edges of the binary alpha mask tapered from 255 to zero to provide a smooth compositing with the background. A binary alpha mask refers to an image having pixels which are represented by code words having a value of zero or 255. Thus, alpha for a binary alpha mask is either zero or 255. Because the binary alpha mask has pixels which can only have two discrete values, the code words representing the pixels of the binary alpha mask can be encoded and decoded as if they were a one bit code word. Thus, a binary image frame is similar to the image frames generated by the bi-level devices discussed earlier.

Two of the main functions of gray scale alpha masks are to feather object edges for smoother compositing and for fades in or out of an object in a video sequence. Feathering refers to a blurring or anti-aliasing of the boundaries of an object to provide a smooth visual transition between objects in the image frame when they are composited together. Fades in or out refer to having an object materialize into a scene slowly through a number of frames of the video sequence by having its pixels transition from completely transparent to opaque or vice versa. Another common function of gray scale alpha masks is for providing the illusion of depth to an object in the image frame by having it slowly disappear in the distance. This spatial fade or dissolve effect is achieved by having the gray scale alpha values of an object in a single frame transition as a function of their pixel position. For example, the alpha values of the pixels may decrease as a function of their horizontal or vertical position.

Most current compression algorithms achieve bit reduction by compressing the gray scale image frame as sequences of blocks or pixels such as the Joint Photographic Experts Group (JPEG) standard and quadtree decomposition algorithm. Unfortunately, neither of these two methods represents the image frames as compactly as possible because neither of them recognizes the functionality achieved by utilizing gray scale alpha masks and instead try to represent the original frame as closely as possible and not just capture the functionality embodied in the original data. Accordingly, these algorithms require a significant number of bits to achieve the gray scale alpha mask functionality. As a result, for many bandwidth constrained applications these methods are unacceptable.

Another recent technique is to decompose a gray scale alpha mask into a binary alpha mask and a texture. The binary alpha mask is encoded with any algorithm applicable to binary alpha masks. The texture is encoded by transforming it with the Discrete Cosine Transformation (DCT) and then quantizing the resulting coefficients. This technique also strives to efficiently represent the original data and not just capture the functionality of the original data. A primary disadvantage with the steps of transforming the texture with the DCT and then quantizing the coefficients is that the bandwidth requirements are significantly greater than with the present invention.

SUMMARY OF THE INVENTION

It is, therefore, an object of the present invention to provide a method for the efficient encoding of the bit data of an alpha mask image frame.

It is another object of the present invention to provide a method to provide compression rates compatible with the MPEG-4 standard.

It is a further object of the present invention to provide a method for generating a gray scale image frame from a binary image frame and a mathematical transform.

It is still another object of the present invention to provide a method for generating a gray scale image frame by using a mathematical transform to feather the edges of an object in a binary image frame.

It is still a further object of the present invention to provide a method for generating a gray scale image frame by using a mathematical transform to provide the illusion of depth to an object in a binary image frame.

It is yet another object of the present invention to provide a method for generating a gray scale image frame by using a mathematical transform to fill in an object in a binary image frame with a constant shade of gray.

In carrying out the above objects and other objects, features, and advantages of the present invention, a method for compressing the bit data of an alpha mask image frame is provided. The method is for use with an alpha mask image frame composed of an array of pixels. Each of the pixels have a vertical and horizontal position. Each of the pixels further have bit data. The bit data have a value representing a level of transparency. The pixels of the alpha mask image frame form at least one object within a closed contour.

The method begins with selecting a modifying function identifier which represents a mathematical transformation for transforming the value of the bit data of at least one pixel as a function of the position of the at least one pixel in the alpha mask image frame. The mathematical transformation represents the bit data of at least one pixel as a function of the position of the pixel in the alpha mask image frame. The mathematical transformation may represent the bit data of the at least one pixel as a function of distance between the at least one pixel and the closed contour, or as a function of the horizonal or vertical position in the image frame.

The next step is applying a threshold function to the alpha mask image frame to generate a binary image frame. Finally, the binary image frame and the modifying function identifier are encoded for transmission.

The method may continue with additional steps such as receiving an encoded signal containing the binary image frame and the modifying function identifier. Then encoded signal is then decoded to extract the binary image frame and the modifying function identifier. The mathematical transformation represented by the modifying function is then selected. The value of the bit data of the at least one pixel is then transformed in accordance with the mathematical transformation.

Further, in carrying out the above objects, the present invention provides another method for use with a gray scale image frame for compressing the bit data of the image frame. The gray scale image frame is composed of an array of pixels each having a vertical and horizontal position. Each of the pixels have bit data. The bit data represents a level of brightness of the pixels.

This method begins with calculating an average value for the pixels having a bit value within a specified range and a position within a specified region of the image frame. The specified region is enclosed by a contour. The gray scale image frame is then converted to a binary image frame. The binary image frame and the average value are then encoded for transmission.

This method may continue with additional steps such as receiving an encoded signal containing the binary image frame and the average value. Then the encoded signal is decoded to extract the binary image frame and the average value. The value of the bit data of the pixels within the specified region is then transformed to the average value so as to construct a gray scale image frame having pixels within the specified region at a constant level of brightness.

BEST MODES FOR CARRYING OUT THE INVENTION

Figure 1:
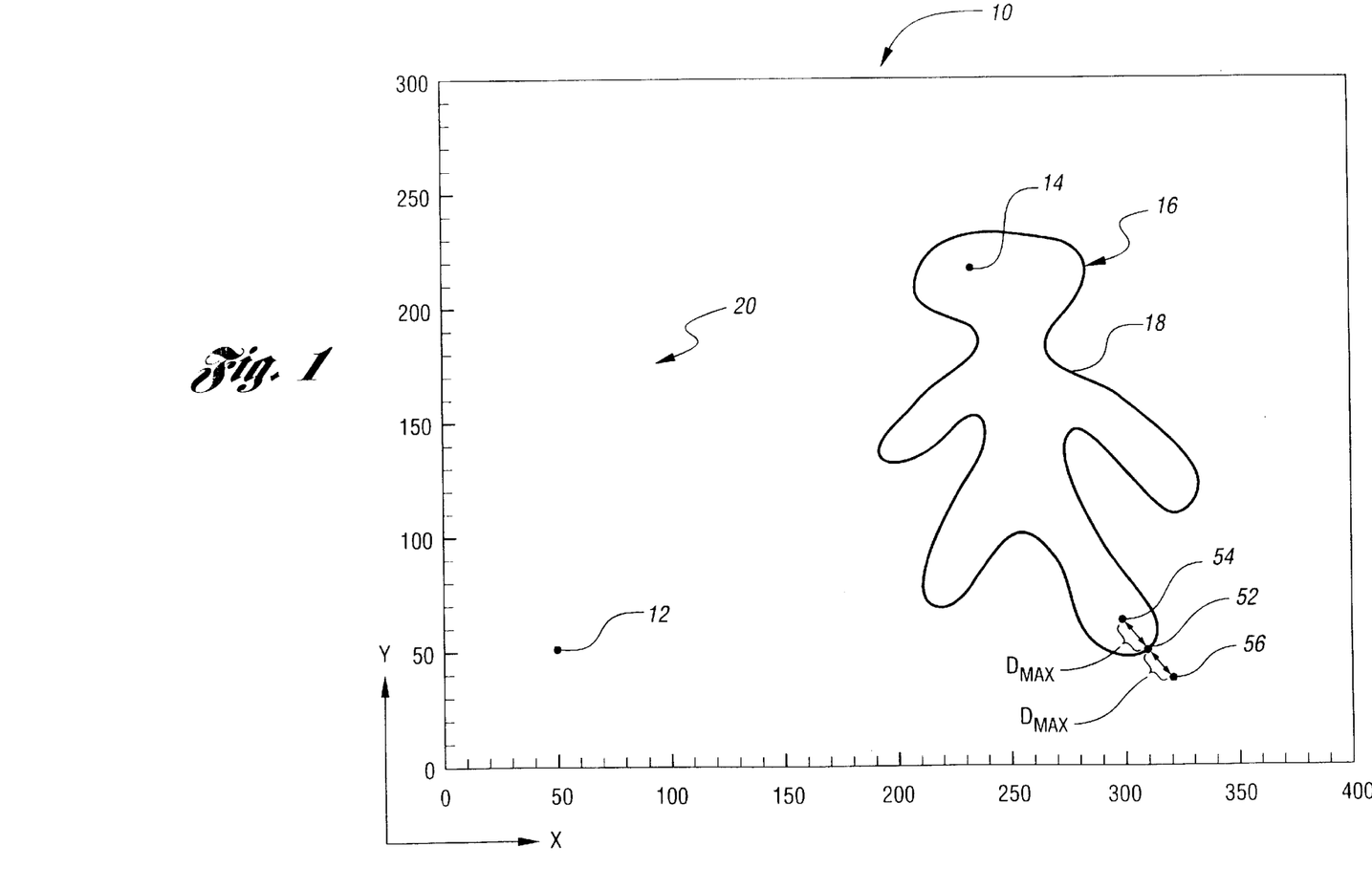
FIG. 1 is a representation of an image frame.

Referring to FIG. 1, a representation of an image frame 10 is shown. Image frame 10 consists of pixels having a horizontal x and vertical y position. For instance, a pixel 12 located at the coordinates (x=50, y=50) is shown and designated as the ($x_{50}$, $y_{50}$) pixel. Similarly, a pixel 14 located at the coordinates (x=230, y=220) is shown and designated as the ($x_{230}$, $y_{220}$) pixel. Image frame 10 is shown as a frame composed of a 400×300 array of pixels. This particular sized array is shown merely for illustrative purposes.

Each of the pixels in image frame 10 is preferably represented by an eight bit code word. The eight bit code word has a value which is indicative of the level of brightness of the pixel. Each bit can have a value of zero or one. Consequently, the values of the code words may range, in base 10 numerals, from zero to 255. The value of 255 means that the pixel is white whereas the value of zero means that the pixel is black. A value roughly in the middle of the range such as 127 means that the pixel has a true gray color.

The pixels have different brightness levels, or shades of gray, to form at least one object in image frame 10 as depicted by an observer. The at least one object is separated from other objects such as the background by a contour. For instance, an object 16 enclosed by a closed contour 18 and separated from an object background 20 is formed collectively by the pixels in image frame 10.

As an example, the pixels forming closed contour 18 may be represented by code words having the value of zero, while the pixels within object 16 and in background 20 may be represented by code words having the value of 255. In this case, closed contour 18 would appear to the observer as a dark black outline with the rest of image frame 10 being white. If the pixels within object 16 are represented by code words having the value of zero then the area within object 16 would be dark black. In this case, background 20 would appear in sharp contrast to object 16 and closed contour 18.

Figure 2:
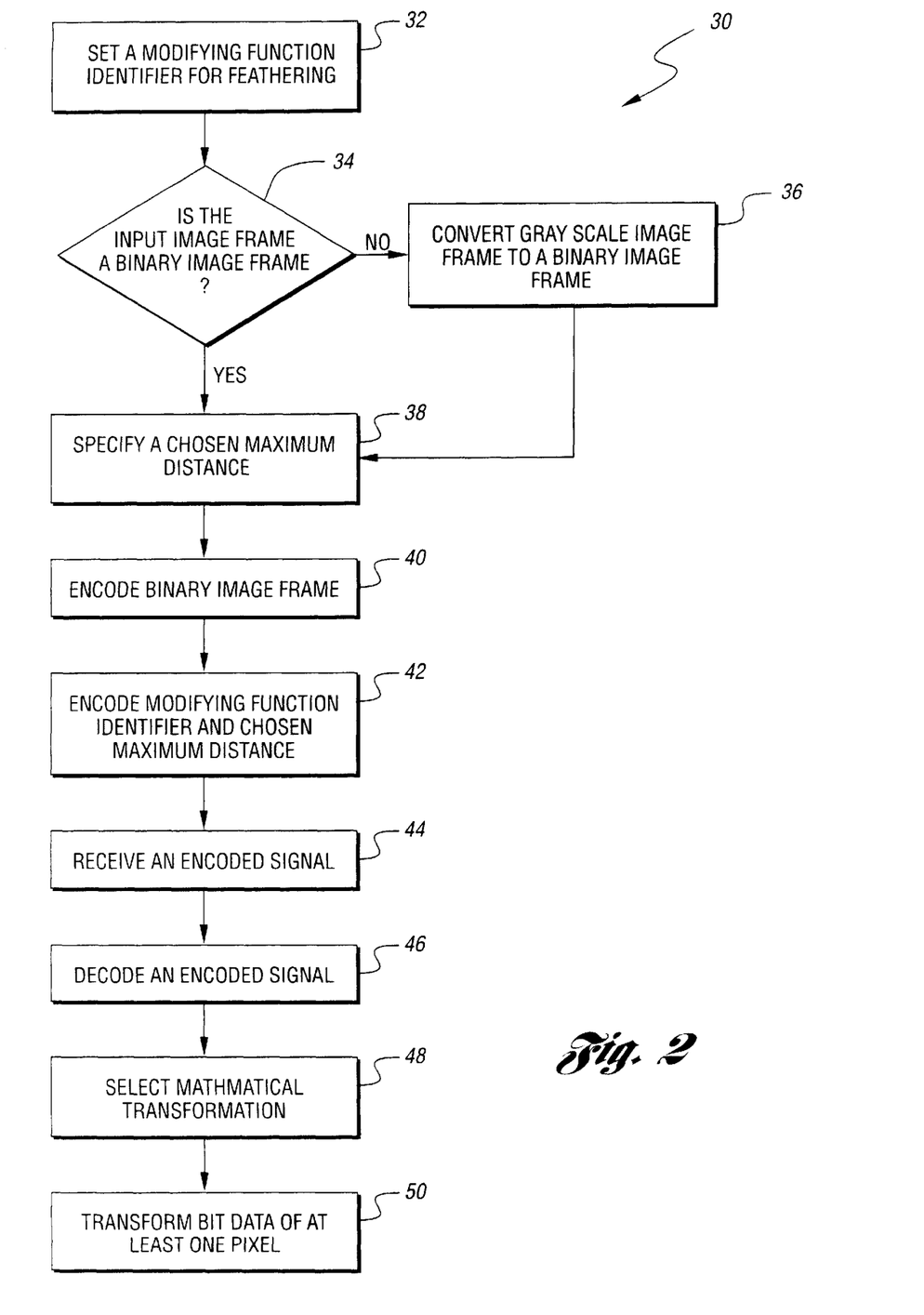
FIG. 2 is a flow diagram representing operation of a feathering system and method according to the present invention.

Referring now to FIG. 2, a feathering method 30 for feathering the area or edges around closed contour 18 is shown. In general, feathering method 30 generates a gray scale image frame from a binary image frame by using a mathematical transformation to feather the edges of an object in a binary image frame. The mathematical transformation may represent the bit data of at least one pixel as a function of the position of the at least one pixel in the alpha mask image frame. If feathering method 30 is selected, block 32 sets a modifying function identifier for feathering method 30. Feathering method 30 begins with receiving an input alpha mask image frame. The input image frame is either a binary image frame or a gray scale image frame.

As discussed above, a binary image frame is an image frame having pixels represented by code words having either one of two values. Typically, for an eight bit code word, the value will either be zero or 255. Because there are only two possible values, each eight bit code word may be compressed by known algorithms as if the code word were a one bit code word. On the other hand, eight bit code words of a gray scale image frame may have any value between zero and 255. Thus, a gray scale image frame cannot be compressed by the known algorithms as if each code word were a one bit code word. Consequently, the number of bits needed to represent pixels of a binary image frame is much less than the number of bits needed to represent a gray scale image frame.

After receiving an input alpha mask image frame, feathering method 30 continues with decision block 34 determining whether the input alpha mask image frame is a binary image frame or a gray scale image frame. If the input image frame is a gray scale image frame, then block 36 converts the gray scale image frame to a binary image frame. Block 36 performs the conversion process by thresholding all code words having a non-zero value to the value of 255. As an example, if a pixel is represented by a code word having a value of 127, meaning that the pixel has a true gray color, then that value is changed to 255 and the pixel then has a white color. The pixels represented by code words having the value of 255 form at least one object within a closed contour in the binary image frame. Only pixels represented by code words having a value of zero do not change to the white color. These pixels form the background of the binary image frame.

If decision block 34 determines that the alpha mask image frame is a binary image frame, then block 38 specifies a chosen maximum distance from the closed contour. The chosen maximum distance represents the distance from the closed contour, in pixels, from which to feather the object and the background so as to provide a smooth compositing effect between the object and background. Depending on the desired effect, the pixels within the distance on both sides of the closed contour, only those on the inside of the contour, or only those on the outside of the contour can be feathered. Block 36 also proceeds to block 38 in the case where the input image frame was a gray scale image frame.

After specifying the chosen maximum distance, block 40 encodes the binary image frame for transmission using the known compression algorithms. Block 42 encodes the modifying function identifier and the chosen maximum distance for transmission.

Feathering method 30 may then continue with block 44 receiving an encoded signal containing the binary image frame, the modifying function identifier, and the chosen maximum distance. Block 46 then decodes the encoded signal to extract the binary image frame, the modifying function identifier, and the chosen maximum distance. Block 48 then selects the mathematical transformation represented by the modifying function identifier. In this case, the mathematical transformation represents the bit data of at least one pixel within the chosen maximum distance of the closed contour as a function of the distance between the at least one pixel and the closed contour. Finally, block 50 transforms the bit data of the at least one pixel in accordance with the mathematical transformation so as to provide a feathering effect between the at least one pixel and the closed contour.

With continuing reference to FIGS. 1 and 2, an example will be discussed to show feathering method 30 in operation. The pixels within object 16 of image frame 10, such as pixel 14, are assumed to be represented by code words having the value of 255. The pixels forming closed contour 18, such as a pixel 52 located at coordinates ($x=_{310}$, $y=_{50}$) are assumed to be represented by code words also having the value of 255. The pixels in background 20, such as pixel 12, are assumed to be represented by code words having the value of zero. Feathering method 30 is employed to provide a smooth compositing of object 16 with background 20 by tapering the values of code words representing pixels within the chosen maximum distance of closed contour 18.

The chosen maximum distance, shown as $D_{MAX}$ in FIG. 1, is preferably the Euclidean distance between the center of a pixel on closed contour 18 to a pixel within or outside of object 16. For instance, the Euclidean distance between pixel 52 located at ($x_{310}$, $y_{30}$) and a pixel 54 located at coordinates ($x=_{300}$, $y=_{60}$) is the square root of 200 as calculated from the Pythagorean Theorem. Similarly, the Euclidean distance between pixel 52 and a pixel 56 located at coordinates ($x=_{320}$, $y=_{40}$) is also the square root of 200. Of course, any other distance measure other than the Euclidean distance may be chosen.

The smooth compositing effect can be employed by modifying the value of the code word representing a pixel as a function of its distance from closed contour 18. For instance, instead of pixel 54 being represented by a code word having the value of 255 the code word is transformed to have a value lower than 255. Pixels within object 16 that are closer to contour 18 than 20 pixel 54 can be represented by even smaller values until contour 18 is reached. The code word values for pixels forming contour 18 are then transformed from 255 to zero.

Similarly, the value of the code word representing pixel 56 can be modified as a function of its distance to contour 18. For instance, instead of pixel 56 being represented by a code word having the value of zero, the code word is transformed to have a value greater than zero. Pixels within background 20 that are closer to contour 18 than pixel 56 can be represented by even larger values until contour 18 is reached. In this case, the code word values for pixels forming contour 18 will remain at 255.

Figure 3:
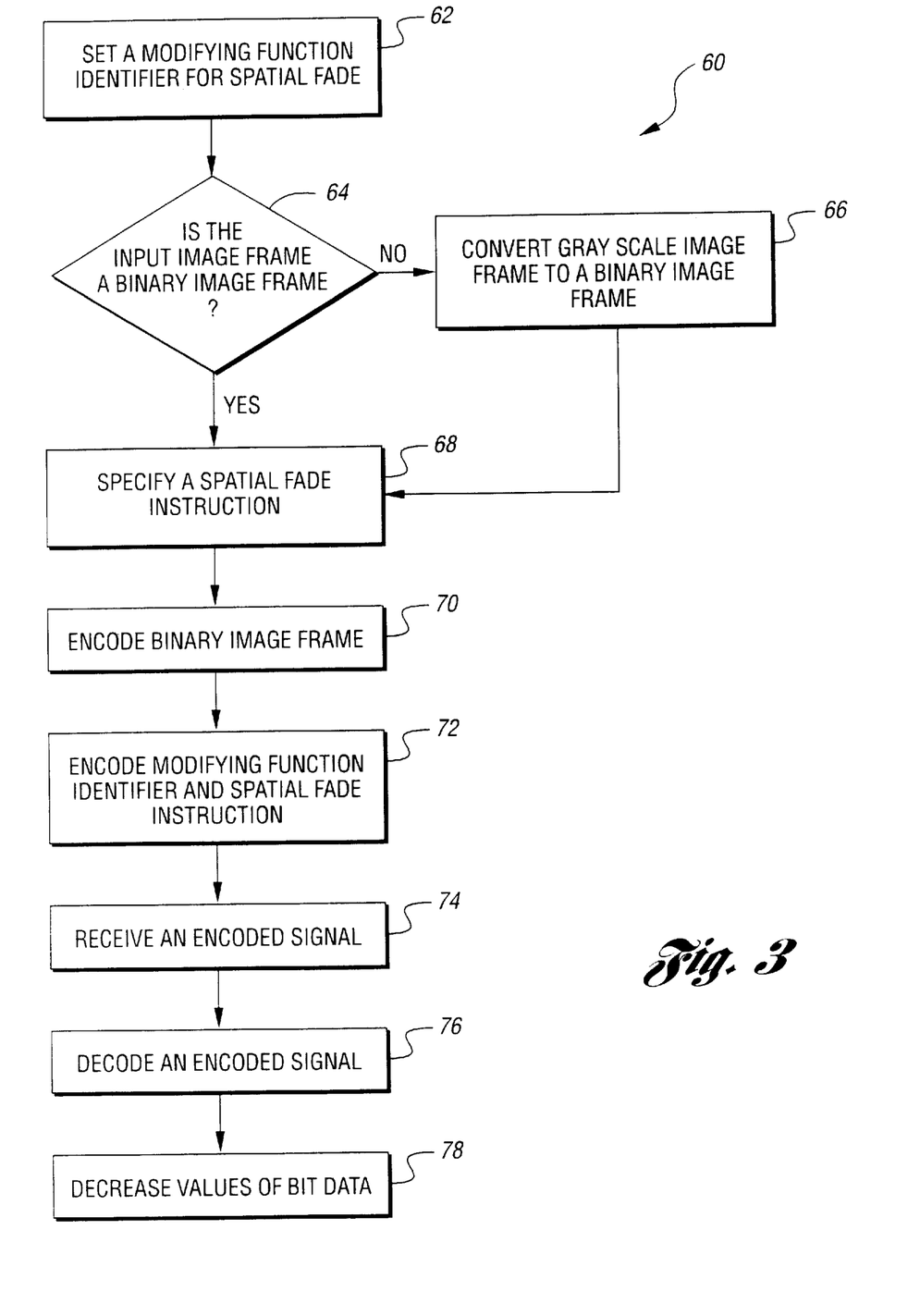
FIG. 3 is a flow diagram representing operation of a spatial fade system and method according to the present invention.

Referring now to FIG. 3, a spatial fade method 60 is shown. In general, spatial fade method 60 generates a gray scale image frame from a binary image frame by using a mathematical transformation to modify the values of the code words representing the pixels in the binary image frame as a function of the pixels's absolute or relative position in the frame. In essence, spatial fade method 60 decreases the value of the code words representing the pixels in the binary image frame either vertically or horizontally and in other directions so as to provide the illusion of depth to an object in the binary image frame.

If spatial fade method 60 is selected, block 62 sets a modifying function identifier for spatial fade method 60. Spatial fade method 60 begins with receiving an input alpha mask image frame. The input image frame is either a binary image frame or a gray scale image frame. Spatial fade method 60 continues with decision block 64 determining whether the input image frame is a binary image frame or a gray scale image frame. If the input alpha mask image frame is a gray scale image frame, block 66 converts the gray scale image frame to a binary image frame. Consequently, pixels represented by code words having the value of 255 form at least one object within a closed contour separated by pixels in the background. The pixels in the background are represented by code words having the value of zero.

If decision block 64 determines that the alpha mask image frame is a binary image frame, then block 68 specifies a spatial fade instruction. The spatial fade instruction is an instruction to modify the values of the binary image frame horizontally, vertically, or in an arbitrary direction. An example of the spatial fade effect is that the further from the top of a frame (absolute position) or top of the object (relative position) a pixel is, the smaller its alpha value. Therefore, the object looks like it is getting further away from the viewer from its top to bottom. Block 66 also proceeds to block 68 in the case where the input image frame was a gray scale image frame.

After specifying the spatial fade instruction, block 70 encodes the binary image frame for transmission using the known compression algorithms. Block 72 encodes the modifying function identifier and the spatial fade instruction for transmission.

Spatial fade method 60 may then continue with block 74 receiving an encoded signal containing the binary image frame, the modifying function identifier, and the spatial fade instruction. Block 76 then decodes the encoded signal to extract the binary image frame, the modifying function identifier, and the spatial fade instruction. Finally, block 78 decreases the values of the code words representing the pixels in the binary image frame in accordance with the spatial fade instruction as a function of the horizontal or vertical position of the pixels in the binary image frame.

Figure 4:
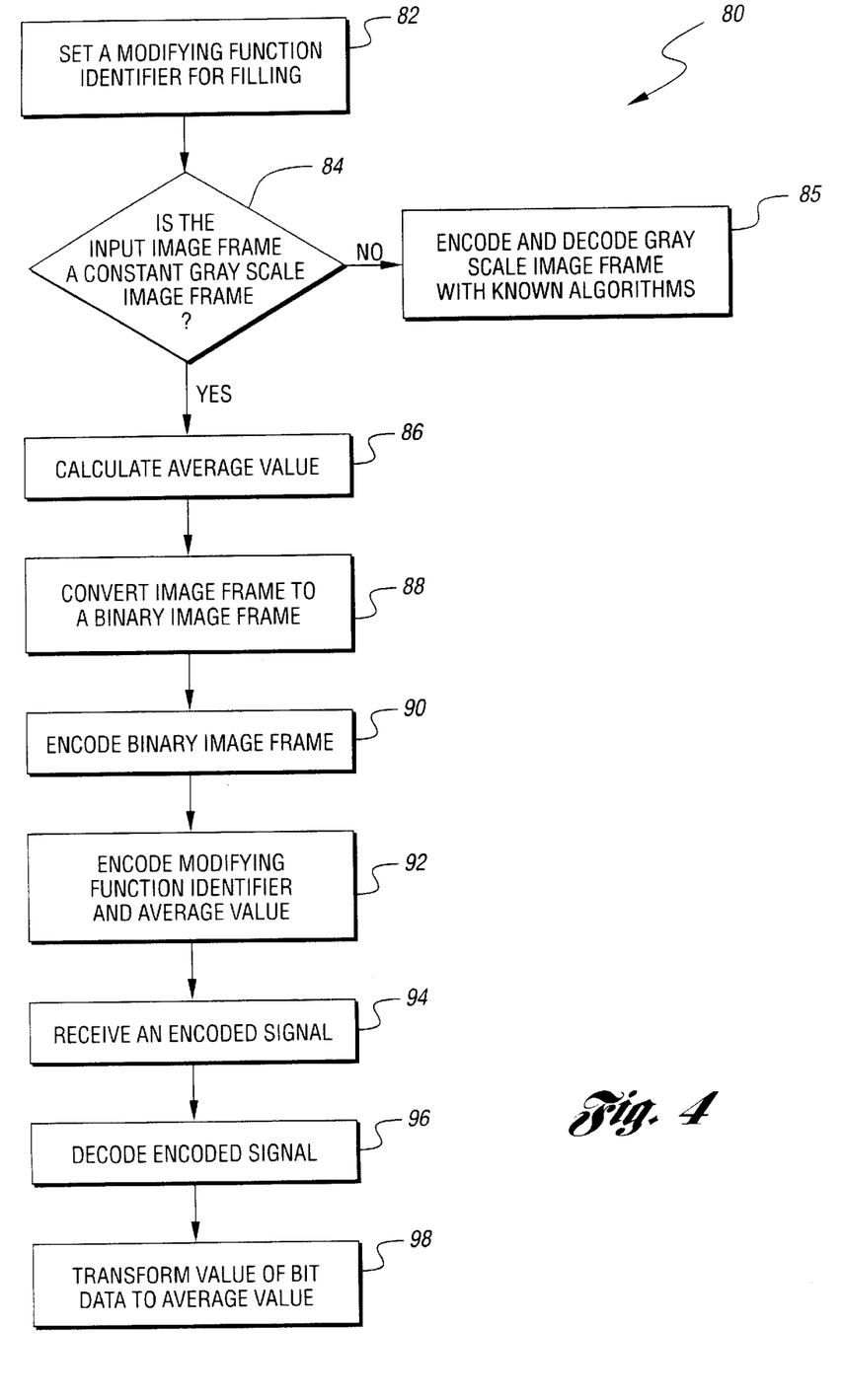
FIG. 4 is a flow diagram representing operation of a filling system and method according to the present invention.

Referring now to FIG. 4, a filling method 80 is shown for filling the area within at least one object with a constant level of brightness. In general, filling method 80 generates a new gray scale image frame by changing the value of code words representing pixels within a specified region of an input gray scale image frame to the average value of the code words. If filling method 80 is selected, block 82 sets a modifying function identifier for filling method.

Filling method 80 begins with receiving an input gray scale image frame. After receiving the input image frame, filling method 80 continues with decision block 84 determining whether the image frame is a constant gray scale image frame. A constant gray scale image frame is a gray scale image frame where all of the pixels represented by non-zero valued code words within a specified region of the image frame are within a specified value range. One example of a specified region is the whole image frame. Another example is the region of the image frame having opaque pixels farther than a given distance from the contour. Hence, alpha is constant and a constant gray scale image frame is a constant alpha image frame. If all of the pixels represented by non-zero valued code words within the specified region of the image frame are not within a specified value range, then the image frame is a standard gray scale image frame. In this case, block 85 encodes and decodes this image frame with known algorithms.

However, if the input image frame is a constant gray scale image frame, then block 86 calculates the average value of the non-zero values of the code words representing the pixels within the specified region of the image frame. Block 88 then converts the constant image frame to a binary image frame. Block 88 performs the conversion process by thresholding all code words having a non-zero value to the value of 255. Block 90 then encodes the binary image frame for transmission using the known compression algorithms. Block 92 encodes the modifying function identifier and the average value for transmission.

Filling method 80 may then continue with block 94 receiving an encoded signal containing the binary image frame, the modifying function identifier, and the average value. Block 96 then decodes the encoded signal to extract the binary image frame, the modifying identifier, and the average value. Block 98 then modifies the binary image frame by transforming the value of the bit data of the pixels within the specified region to the average value so as to construct a gray scale image frame having a region with a constant level of brightness. Fades in and out are accomplished by changing the alpha value sent each frame (gradually increasing or decreasing it).

Figure 5:
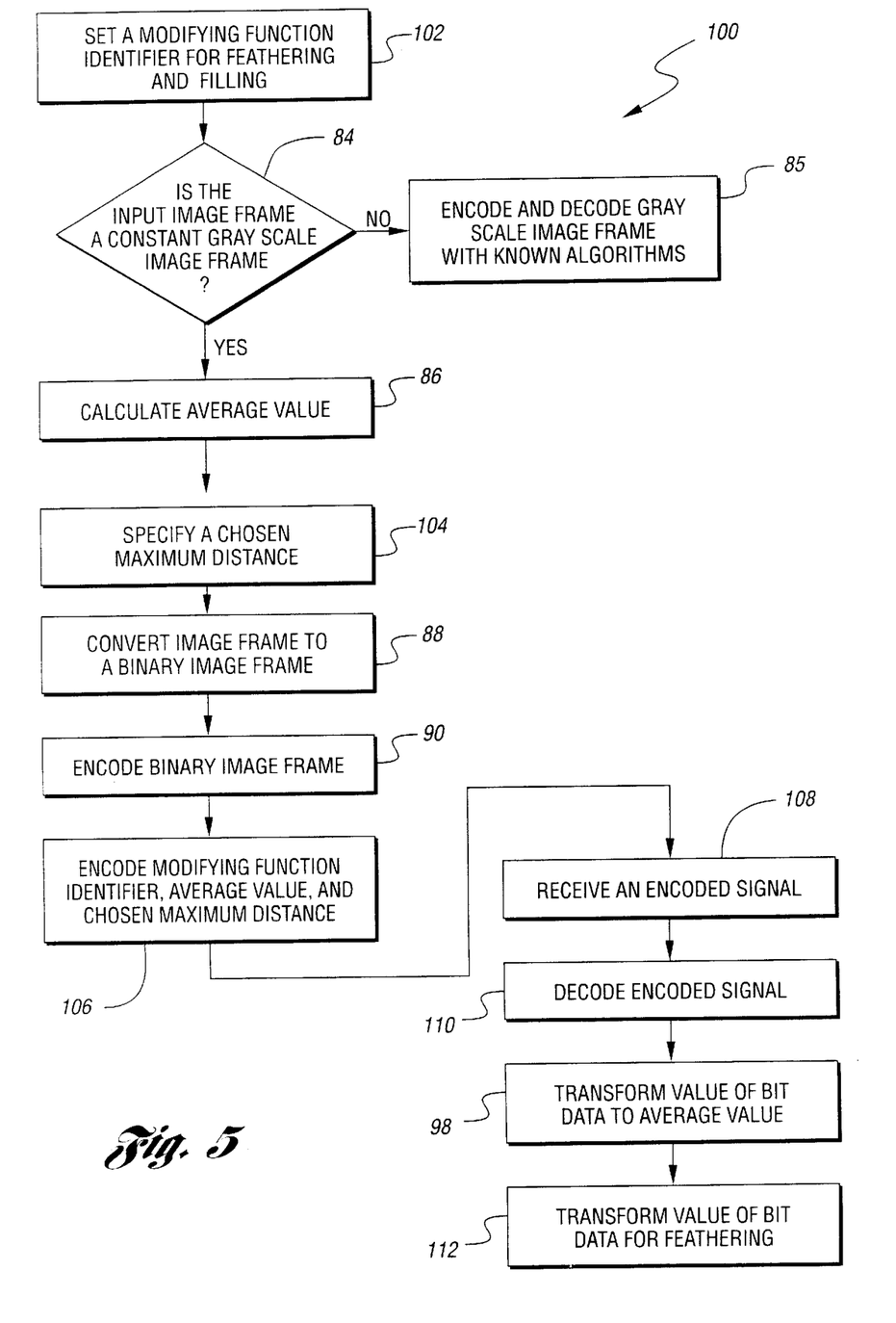
FIG. 5 is a flow diagram representing operation of a combined feathering and filling system and method according to the present invention.

Referring now to FIG. 5, a feathering and filling method 100 is shown. Feathering and filling method 100 uses many of the same processes as filling method 80 shown in FIG. 4. Accordingly, the same processes are marked with the same reference numeral. Feathering and filling method 100 is used for filling the area within at least one object with a constant level of brightness and then tapering the level of brightness around the contour of the object so as to provide a feathering effect. In general, feathering and filling method 100 generates a gray scale image frame by changing the value of code words representing pixels within a specified region of an input gray scale image frame to the average value of the code words like filling method 80. However, feathering and filling method 100 includes additional feathering steps so as to feather the constant level of brightness around the contour of the object. If feathering and filling method 100 is selected, then block 102 sets a modifying function identifier for feathering and filling.

Feathering and filling method 100 begins with receiving an input gray scale image frame. After receiving the input image frame, feathering and filling method 100 continues with decision block 84 determining whether the image frame is a constant gray scale image frame. If the input image frame is a constant gray scale image frame, then block 86 calculates the average value of the non-zero values of the code words representing the pixels within a specified region of the image frame.

Block 104 then specifies a chosen maximum distance from the contour. The chosen maximum distance represents the distance from the contour, in pixels, from which to feather the object and the background so as to provide a smooth compositing effect between the object and background.

Block 88 then converts the constant gray scale image frame to a binary image frame. Block 90 then encodes the binary image frame for transmission using the known compression algorithms. Block 106 encodes the modifying function identifier, the average value, and the chosen maximum distance for transmission.

Feathering and filling method 100 may then continue with block 108 receiving an encoded signal containing the binary image frame, the modifying function identifier, the average value, and the chosen maximum distance. Block 110 then decodes the encoded signal to extract the binary image frame, the modifying function identifier, the average value, and the chosen maximum distance. Block 98 then modifies the binary image frame by transforming the value of the bit data of the pixels within the specified region to the average value so as to construct a gray scale image frame having a region with a constant level of brightness. Finally, block 112 transforms the binary image frame again by tapering from the constant alpha to zero the values of code words representing pixels within the chosen maximum distance of the closed contour.

In essence, the methods of the present invention all have the common trait of greatly reducing the number of bits required to reconstruct a gray scale image frame from an input binary image frame or a gray scale image frame. All of the methods convert an input gray scale image frame to a binary image frame. The binary image frame, because it contains much less information than a gray scale image frame, can be compressed to a minimal number of bits. A modifying function is attached to the compressed binary image frame. The modifying function symbolically describes the texture of the gray scale image frame. It may be selected by human intervention or automatically with an algorithm that analyzes the input gray scale alpha masks or the functionality desired with gray scale alpha masks. In essence, the modifying function is a mathematical transform to vary the bit data of a pixel as a function of the distance between the pixel in relation to a particular point of feature, as a function of the position and/or environment of the pixel in the image frame, or any combination of these. This modifying function is utilized to reconstruct a gray scale image from the binary image frame. Because only a binary image frame and a modifying function are needed to generate a gray scale image frame compression rates compatible with the MPEG 4 standard are obtainable.

Because only a modifying function and a binary image frame are needed to reconstruct a gray scale image frame, it will be appreciated by those skilled in the art that the modifying function can be implemented with many other methods, such as by filtering the binary mask and with complex transforms such as higher order polynomials to represent more complex gray scale image frames.

The methods of the present invention recognize that a large percentage of alpha mask image frames have a simple texture or structure because they are used for common purposes such as feathering, filling, fading, etc. Hence, the methods select a modifying function identifier which represents a mathematical transformation. The mathematical transformation is used to change the values of code words representing pixels in an image frame to bring about the common purposes. Of course, the mathematical transformation can transform the values of code words of pixels in a binary image frame received in an encoded signal or can transform the values of code words of pixels of other image frames. The methods of the present invention are directed to representing the functionality of the gray scale alpha masks rather than simply recreating an original gray scale alpha mask.

The present invention has been simulated as part of a core experiment proposal for incorporation into the MPEG 4 Standard for Coding of Moving Pictures and Associated Audio Information. Based on simulations, the present invention provides a significant improvement as measured by subjective image quality as well as the number of bits required to code the shaping information.

While the best mode for carrying out the present invention has been described in detail, those familiar with the art to which this invention relates will recognize various alternative designs as defined by the following claims.

What is claimed is:

1. For an alpha mask image frame composed of an array of pixels each having a vertical and horizontal position and bit data having a value representing a level of brightness, wherein the pixels in the alpha mask image frame form at least one object within a closed contour, a method for compressing the bit data of the alpha mask image frame comprising:

specifying a chosen maximum distance from the closed contour of the at least one object;

selecting a modifying function identifier which represents a feathering mathematical transformation for transforming the value of the bit data of the pixels within the chosen maximum distance of the closed contour as a function of the distance between the position of the pixels and the closed contour in the alpha mask image frame;

applying a threshold function to the alpha mask image frame to generate a binary image frame; and encoding the binary image frame, the chosen maximum distance, and the modifying function identifier for transmission, wherein the binary image frame has at least one object within the closed contour.

2. The method of claim 1 further comprising:

receiving an encoded signal containing the binary image frame, the chosen maximum distance, and the modifying function identifier;

decoding the encoded signal to extract the binary image frame, the chosen maximum distance, and the modifying function identifier; and transforming the value of the bit data of the pixels within the chosen maximum distance of the closed contour in accordance with the feathering mathematical transformation.

3. The method of claim 1 wherein:

the modifying function identifier represents a feathering mathematical transformation for transforming the value of the bit data of the pixels within the chosen maximum distance of the closed contour as a linear transition between the position of the pixels and the closed contour.

4. A method for generating a gray scale image frame from a binary image frame, wherein the binary image frame is composed of an array of pixels each having a vertical and horizontal position and bit data having a value representing a level of brightness, the method comprising:

receiving an encoded signal containing a binary image frame, a chosen maximum distance from a closed contour of at least one object in the binary image frame, and a modifying function identifier, wherein the modifying function identifier represents a feathering mathematical transformation for transforming the value of the bit data of the pixels within the chosen maximum distance of the closed contour as a function of the distance between the position of the the pixels and the closed contour in the gray scale image frame;

decoding the encoded signal to extract the binary image frame, the chosen maximum distance, and the modifying function identifier;

selecting the feathering mathematical transformation represented by modifying function identifier; and transforming the value of the bit data of at least one pixel within the chosen maximum distance of the closed contour in accordance with the mathematical transformation.

\* \* \* \* \*